(12) United States Patent
Santoni

(10) Patent No.: US 9,387,884 B2
(45) Date of Patent: Jul. 12, 2016

(54) VEHICLE BODY

(71) Applicant: McLaren Automotive Limited, Woking, Surrey (GB)

(72) Inventor: Claudio Santoni, Guildford (GB)

(73) Assignee: McLaren Automotive Limited, Woking (GB)

( * ) Notice: Subject to any disclaimer, the term of this patent is extended or adjusted under 35 U.S.C. 154(b) by 196 days.

(21) Appl. No.: 14/010,173

(22) Filed: Aug. 26, 2013

(65) Prior Publication Data

US 2014/0239546 A1    Aug. 28, 2014

(30) Foreign Application Priority Data

Feb. 28, 2013   (GB) .................................. 1303581.1

(51) Int. Cl.
| | |
|---|---|
| B62D 23/00 | (2006.01) |
| B62D 29/04 | (2006.01) |
| B29C 70/34 | (2006.01) |
| B29C 70/86 | (2006.01) |
| B29C 43/36 | (2006.01) |

(52) U.S. Cl.
CPC .............. B62D 23/00 (2013.01); B29C 70/342 (2013.01); B29C 70/86 (2013.01); B62D 29/046 (2013.01); *B29C 2043/3652* (2013.01)

(58) Field of Classification Search
CPC .. B62D 29/046; B62D 29/048; B62D 29/043; B29C 70/342; B29C 43/3642
USPC ......................................... 264/511, 512, 516
See application file for complete search history.

(56) References Cited

U.S. PATENT DOCUMENTS

| | | | | |
|---|---|---|---|---|
| 3,550,948 | A | * | 12/1970 | Thompson, Jr. ............ 296/181.2 |
| 3,814,372 | A | * | 6/1974 | Western .................... B28B 7/06 |
| | | | | 249/65 |
| 4,125,526 | A | | 11/1978 | McCready |
| 4,863,771 | A | * | 9/1989 | Freeman ....................... 428/36.1 |
| 4,882,118 | A | * | 11/1989 | Megarry ........................ 264/510 |
| 5,714,104 | A | * | 2/1998 | Bailey et al. .................. 264/254 |
| 5,961,764 | A | | 10/1999 | Sydow et al. |
| 6,257,858 | B1 | * | 7/2001 | Pabsch et al. .............. 425/129.1 |
| 2009/0243160 | A1 | | 10/2009 | Chiang |
| 2010/0013119 | A1 | * | 1/2010 | Meggiolan et al. ......... 264/271.1 |
| 2010/0196637 | A1 | * | 8/2010 | Lippert ................. B29C 70/345 |
| | | | | 428/36.1 |
| 2014/0239546 | A1 | * | 8/2014 | Santoni ......................... 264/265 |

FOREIGN PATENT DOCUMENTS

| | | | |
|---|---|---|---|
| EP | 2534029 A1 | | 12/2012 |
| WO | WO 87/06901 A1 | | 11/1987 |
| WO | WO 2011/113912 A1 | | 9/2011 |
| WO | WO 2012107899 A1 | * | 8/2012 |

OTHER PUBLICATIONS

European Patent Office, Extended European Search Report for Application No. 14156866.7, May 4, 2015, 6 pages, Germany.

* cited by examiner

*Primary Examiner* — Philip Tucker
*Assistant Examiner* — Jimmy Smith, Jr.
(74) *Attorney, Agent, or Firm* — Alston & Bird LLP

(57) ABSTRACT

A method for forming a vehicle body, comprising: forming a rigid tub; mating the rigid tub to a first mold for a superstructure of the vehicle body; and subsequently rigidifying material in the first mold while part of that material is in contact with the tub to thereby form the superstructure of the vehicle body integral with the tub.

20 Claims, 4 Drawing Sheets

VEHICLE BODY

CROSS-REFERENCE TO RELATED APPLICATIONS

This patent application claims priority to and the benefit of Great Britain Application No. GB 1303581.1, filed on Feb. 28, 2013, the contents of which are hereby incorporated by reference herein in their entirety.

BACKGROUND

1. Related Field

This invention relates to manufacturing vehicle bodies.

2. Related Art

A crucial part of automobile design is making the body of the vehicle sufficiently strong to protect the occupants in the event of a crash, and sufficiently stiff to prevent bending or torsion of the body from affecting the vehicle's handling. One way of making a relatively strong body is to use a composite tub, for example as described in EP 2 534 029 A.

Figure 1:
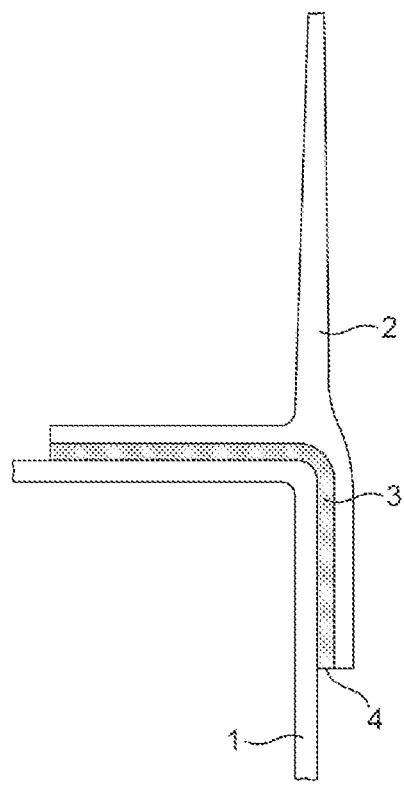
Figure 2:
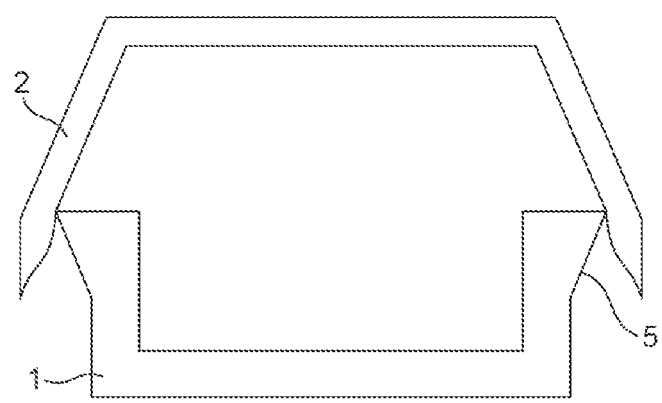

A typical composite tub has a floor, sills upstanding from the floor along the sides of the floor and front and rear bulkheads upstanding from the floor at the front and rear of the floor. The vehicle's running gear and powertrain can be attached to the front and rear bulkheads. For an open racing car this structure may be sufficient, but for a passenger car or an enclosed racing car it is normally desirable to fit a roof to the tub. This is normally done by forming the roof separately and then attaching it to the tub: either by bolting it in place or by bonding it to the tub using adhesive. Using bolts is undesirable because it introduces additional weight and concentrates the loads between the roof and the tub on the areas to which the bolts are attached. FIG. 1 shows an adhesive join between a tub and a roof. FIG. 1 is a cross-section through the join, showing part of a tub 1, part of a roof 2, and a layer 3 of adhesive between the tub and the roof. Joints of this type suffer from a number of limitations. First, because the structures involved are of a considerable size, and because the integrity of the bond between the roof and the tub is of great importance for crash-worthiness, the adhesive joins are typically large. As a result, the adhesive introduces considerable additional mass. Second, it is difficult to ensure a perfect fit between the roof and the tub. One or both of the components may need to be machined in order to get them to fit together. Any machining introduces additional time and cost. Third, there is normally an abrupt end to the overlap between the roof and the tub, as shown at 4, and a significant spacing between the roof and the tub because of the thickness of the adhesive. This concentrates stress on the tub, reducing its strength. Finally, because the roof and the tub are rigid when they are married together, the tub cannot have undercuts in the area where it will be bonded to the roof. As illustrated in FIG. 2, if the bottom of the roof 2 is sufficiently wide that it can be lowered on to the tub 1, it cannot make contact with the tub at the undercut region 5. This limits design freedom unless it is decided to do without the roof material bridging the join between the roof and the tub; in which case strength would be compromised.

It would be desirable to have an improved way of attaching a roof to a tub.

BRIEF SUMMARY

According to the present invention there is provided a method for forming a vehicle body, comprising: forming a rigid tub; mating the rigid tub to a first mould for a superstructure of the vehicle body; and subsequently rigidifying material in the first mould whilst part of that material is in contact with the tub to thereby form the superstructure of the vehicle body integral with the tub.

The step of mating the rigid tub to the first mould may comprise locating the tub to the first mould by aligning a datum feature on the tub with a datum feature on the first mould.

The method may comprise, after the said curing step, attaching a component of the vehicle to the tub with the datum feature on the tub aligned with a datum feature on the component. The component may be a part of the running gear or powertrain of the vehicle: for example a suspension carrier or an engine carrier.

In any of the above described embodiments, the said material may comprise a superstructure portion and a bonding portion integral with the superstructure portion and in contact with the tub. The superstructure portion may be intended to form a roof of the vehicle. The bonding portion may overlap the tub for bonding the superstructure portion to the tub. The said material may be a fibre-reinforced material. Reinforcing fibres may bridge between the superstructure portion and the bonding portion.

Still further, in any of the above described embodiments and/or combinations thereof, the first mould may comprise a flexible portion. The rigidifying step may thus comprise causing the flexible portion to flex so as to bear against at least part of the bonding portion. The flexible portion may press at least part of the bonding portion against the tub. The first mould may further comprise a non-flexible portion a surface of which defines the shape of at least part of the superstructure portion. The flexible portion may comprise a distal region and a proximal region located between the distal region and the superstructure portion, and the distal region may have greater freedom of movement than the proximal region. The rigidifying step may comprise applying pressure to the flexible portion to consolidate the bonding portion against the tub. Following the rigidifying step the bonding portion is preferably thinner at an end remote from the superstructure portion than at an end proximal to the superstructure portion. A tapering profile may be achieved by staggering the termination points of sub-layers or fibres of the material of the bonding portion such that they terminate at different distances from the end remote from the superstructure portion.

The step of forming a rigid tub may comprise: pressing a hollow body of material against the interior of a second mould by means of an inflatable core located within the hollow body; and rigidifying the hollow body with the inflatable core located therein so as to form at least part of the tub; keeping the inflatable core in the hollow body of the tub until the said step of rigidifying material in the first mould; and the said step of rigidifying material in the first mould may comprise applying pressure against the first mould by means of the inflatable core.

The material of the superstructure may be of a reinforced resin composite material. The step of rigidifying material in the first mould according to any of the above described embodiments may comprise curing the resin. The superstructure may be adhered to the tub by the resin. Additional adhesive may be incorporated on the surface of the tub to aid adhesion of the superstructure.

At an interface between the superstructure and the tub the material of the superstructure may split such that and a first limb of the material extends from the interface in a first direction over the tub and a second limb of the material extends from the interface in a second direction over the tub. The angle between the first and second directions may be between 45° and 135°. During the step of rigidifying the material in the mould, the first and second limbs of material are preferably pressurised against the tub in directions that deviate from each other by greater than 45°, more preferably greater than 70°.

According to a second aspect of the present invention there is provided a method for forming an integrated structure comprising first and second bodies, the method comprising: forming the first body in a rigid state and subsequently: preparing a mould for the second body, the mould being mated to the first rigid body and the mould comprising a first, rigid zone adjacent to first precursor material for the second body and a second, flexible zone adjacent to second precursor material for the second body; applying pressure against the flexible zone to urge the second precursor material against the first body; and rigidifying the precursor material whilst the second precursor material is in contact with the first body. This method may be provided in conjunction with any of the various above-described embodiments or otherwise.

The second, flexible zone may be anchored to the first, rigid zone prior to the step of applying pressure. The first and second zones may be parts of a common mould tool. During the rigidifying step the second, flexible zone may be anchored to the first, rigid zone at the boundary of the first body. The second, flexible zone may be constituted by one or more flexible plates attached to the first, rigid zone. During the rigidifying step the second, flexible zone may have greater mobility relative to the first body at an end remote from the first, rigid zone than at an end adjacent the first, rigid zone.

In any of the described embodiments, the step of applying pressure may comprise causing the second precursor material to adopt a tapering profile that becomes thinner towards an edge of the second precursor material remote from the first precursor material.

In any of the described embodiments, the precursor material may comprise a resin matrix and a reinforcing component. Likewise, in any of the described embodiments, the rigidifying step may comprise bonding the second body to the first body by means of the resin comprised in the precursor material.

In any of the described embodiments, the first body may comprise an adhesive layer. During the step of rigidifying the precursor material the second precursor material may be in contact with the adhesive layer of the first body.

In any of the described embodiments, the step of applying pressure may comprise applying a pressure by means of an inflatable flexible and/or elastic bag bearing against the second, flexible zone. During the step of applying pressure the flexible tool may flex relative to the rigid tool. Preferably during the step of applying pressure the flexible tool does not stretch relative to the rigid tool during the process. Preferably the flexible tool is incompressible, so it does not change in thickness as pressure is applied during the process.

According to various embodiments, in a first claim, a method for forming a vehicle body is provided, comprising: forming a rigid tub; mating the rigid tub to a first mould for a superstructure of the vehicle body; and subsequently rigidifying material in the first mould whilst part of that material is in contact with the tub to thereby form the superstructure of the vehicle body integral with the tub.

According to a second claim, in the method of the above-described first claim, the step of mating the rigid tub to the first mould comprises locating the tub to the first mould by aligning a datum feature on the tub with a datum feature on the first mould.

According to a third claim according to the method of the above described second claim, the method comprises, after the said curing step, attaching a component of the vehicle to the tub with the datum feature on the tub aligned with a datum feature on the component.

According to a fourth claim, in the method of the third claim, the component is a part of the running gear or powertrain of the vehicle.

According to a fifth claim, in the method of any preceding claim, the material comprises a superstructure portion and a bonding portion integral with the superstructure portion and in contact with the tub.

According to a sixth claim, in the method of the fifth claim, the material is a fibre-reinforced material and fibres of the material extend between the superstructure portion and the bonding portion.

According to a seventh claim, in the method of the fifth or the sixth claim, the first mould comprises a flexible portion and the rigidifying step comprises causing the flexible portion to flex so as to bear against at least part of the bonding portion.

According to an eighth claim, in the method of the seventh claim, the first mould further comprises a non-flexible portion a surface of which defines the shape of at least part of the superstructure portion.

According to a ninth claim, in the method of the seventh or eighth claim, the flexible portion comprises a distal region and a proximal region located between the distal region and the superstructure portion, and the distal region has greater freedom of movement than the proximal region.

According to a tenth claim, in the method of any of the seventh through ninth claims, the rigidifying step comprises applying pressure to the flexible portion to consolidate the bonding portion against the tub.

According to an eleventh claim, in the method of the tenth claim, following the rigidifying step the bonding portion is thinner at an end remote from the superstructure portion than at an end proximal to the superstructure portion.

According to a twelfth claim, in the method of any preceding claim, the step of forming a rigid tub comprises: pressing a hollow body of material against the interior of a second mould by means of an inflatable core located within the hollow body; and rigidifying the hollow body with the inflatable core located therein so as to form at least part of the tub; keeping the inflatable core in the hollow body of the tub until the said step of rigidifying material in the first mould; and the said step of rigidifying material in the first mould comprises applying pressure against the first mould by means of the inflatable core.

According to a thirteenth claim, in the method of any preceding claim, the material of the superstructure is of a reinforced resin composite material; the step of rigidifying material in the first mould comprises curing the resin; and the superstructure is adhered to the tub by the resin.

According to a fourteenth claim, in the method of any preceding claim, at an interface between the superstructure and the tub the material of the superstructure bifurcates such that and a first limb of the material extends in a first direction over the tub and a second limb of the material extends in a second direction over the tub, the angle between the first and second directions being between 45° and 135°.

According to a fifteenth claim, a method is provided for forming an integrated structure comprising first and second bodies, the method comprising forming the first body in a rigid state and subsequently: preparing a mould for the second body, the mould being mated to the first rigid body and the mould comprising a first, rigid zone adjacent to first precursor material for the second body and a second, flexible zone adjacent to second precursor material for the second body; applying pressure against the flexible zone to urge the second precursor material against the first body; and rigidifying the precursor material whilst the second precursor material is in contact with the first body.

According to a sixteenth claim, in the method of the fifteenth claim, the second, flexible zone is anchored to the first, rigid zone.

According to a seventeenth claim, in the method of the sixteenth claim, during the rigidifying step the second, flexible zone is anchored to the first, rigid zone at the boundary of the first body.

According to an eighteenth claim, in the method of the sixteenth or seventeenth claims, the second, flexible zone is constituted by one or more flexible plates attached to the first, rigid zone.

According to a nineteenth claim, in the method of any of the sixteenth through the eighteenth claims, during the rigidifying step the second, flexible zone has greater mobility relative to the first body at an end remote from the first, rigid zone than at an end adjacent the first, rigid zone.

According to a twentieth claim, in the method of any of the fifteenth through the nineteenth claims, the step of applying pressure comprises causing the second precursor material to adopt a tapering profile that becomes thinner towards an edge of the second precursor material remote from the first precursor material.

According to a twenty-first claim, in the method of any of the fifteenth through the twentieth claims, the precursor material comprises a resin matrix and a reinforcing component and the rigidifying step comprises bonding the second body to the first body by means of the resin comprised in the precursor material.

According to a twenty-second claim, in the method of any of the fifteenth through the twenty-first claims, the first body comprises an adhesive layer and wherein during the step of rigidifying the precursor material the second precursor material is in contact with the adhesive layer of the first body.

According to a twenty-third claim, in the method of any of the fifteenth through the twenty-second claims, the step of applying pressure comprises applying a pressure by means of an inflatable flexible bag bearing against the second, flexible zone.

According to a twenty-fourth claim, a vehicle or method substantially as herein described with reference to FIGS. 3 to 6 of the accompanying drawings is provided.

BRIEF DESCRIPTION OF THE SEVERAL VIEWS OF THE DRAWING(S)

Figure 3:
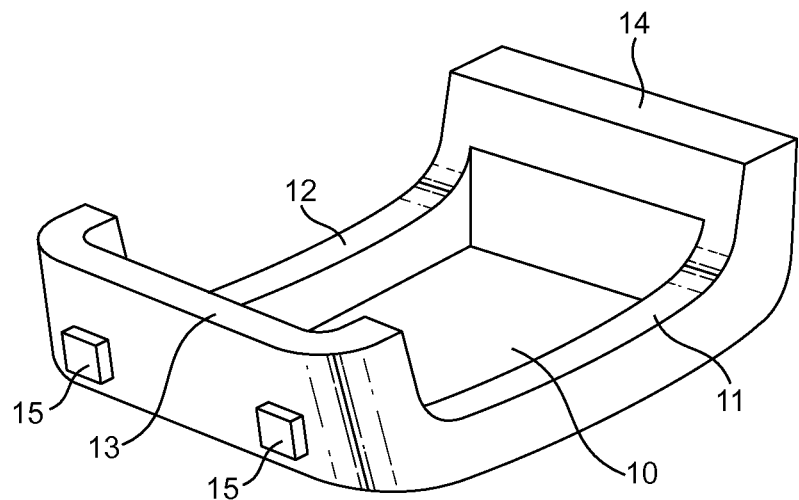
Figure 4:
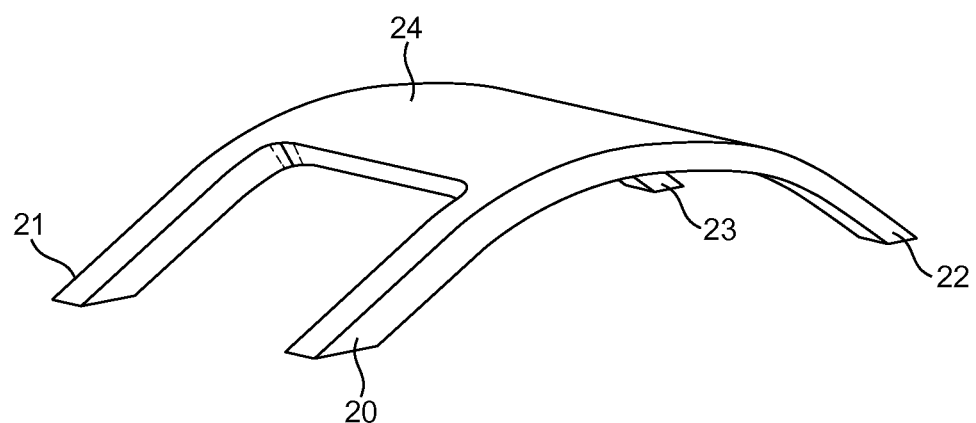
Figure 5:
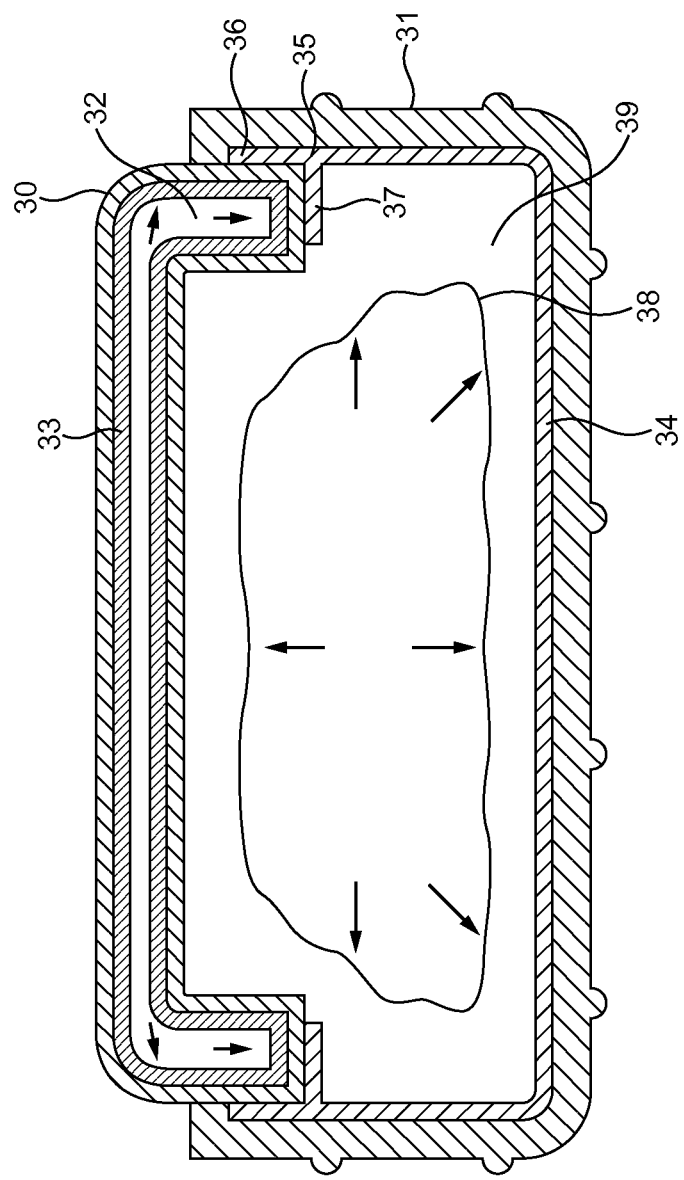
Figure 6:
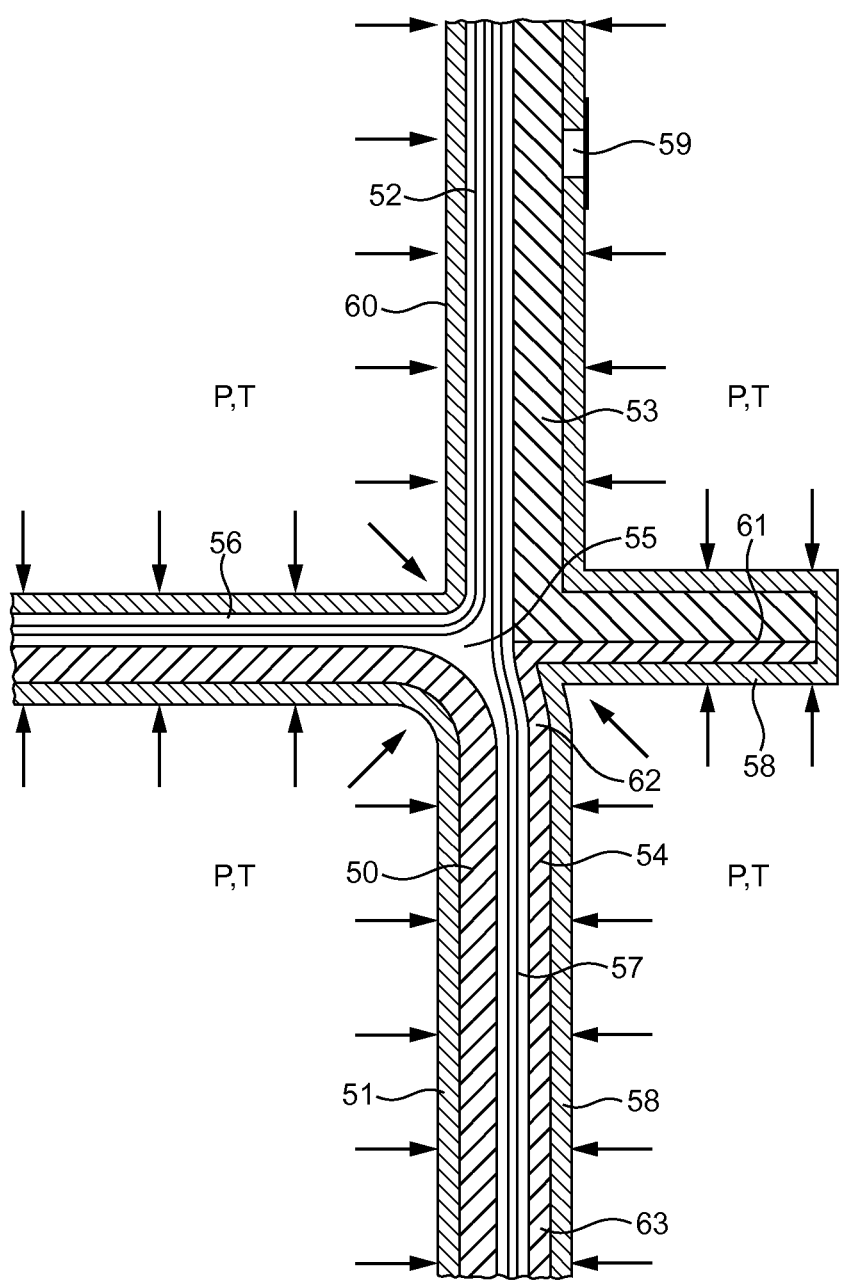

Having thus described the invention in general terms, reference will now be made to the accompanying drawings, which are not necessarily drawn to scale, and wherein:

FIG. 1 shows an adhesive joint.
FIG. 2 illustrates an undercut tub.
FIG. 3 shows a tub for an automobile.
FIG. 4 shows the intended shape of a roof for the tub of FIG. 3.
FIG. 5 illustrates the manufacture of a roof on a tub.
FIG. 6 shows a cross-section through a part of a join between a tub and a roof during manufacture.

DETAILED DESCRIPTION OF VARIOUS EMBODIMENTS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the examples to be described below, first a tub is formed so that it is in a rigid state. Then the tub is offered up to a mould for a roof and the roof is moulded integrally with the tub.

FIG. 3 shows a tub for an automobile. The tub has a floor 10. Upstanding from the sides of the floor are sills 11, 12. Upstanding from the front and rear of the floor are front and rear bulkheads 13, 14. The front bulkhead 13 has attachment points 15 for the front running gear of the vehicle. The rear bulkhead may have similar attachment points for the rear running gear. In this way, the tub bridges between the front and rear running gear. The vehicle's powertrain can be attached to the front or rear bulkhead. Seats for occupants can be installed inside the tub.

The tub can be formed of any suitable material, but conveniently it can be formed of a reinforced polymer composite material such as a carbon fibre reinforced polymer (CFRP). The polymer could, for example be an epoxy. The polymer could be reinforced with other components such as aramid or glass fibres, or particles. Alternatively, the tub could be formed of metal: for example it could be an aluminium box structure. Taking CFRP as an example, the tub can be formed by moulding, for example in the manner described in EP 2 534 029 A.

For illustration, FIG. 4 shows generally (and ignoring any attachment points, which will be described in more detail below) the form of the roof that might be desired to extend from the tub of FIG. 3. The roof comprises front or "A" pillars 20, 21 which would extend from the front bulkhead 13, rear or "C" pillars 22, 23 which would extend from the rear bulkhead 14 and a top plate 24 which would form a covering for the interior of the tub when the roof was attached to the tub. Windows and doors could be installed in the gaps between the pillars. Other designs of roof are possible. For example it is possible to do away with the top plate 24 and replace it with a retractable soft-top or retractable hard-top mechanism.

As indicated above, in the present example the roof is attached to the tub by being moulded integrally with the tub when the tub is already rigid. This can involve providing a flexible precursor of the roof, contacting a part of that precursor with the tub whilst that part of the precursor remains flexible and rigidifying the roof precursor. The roof precursor may contain resin that is destined to cure to form the matrix of the final roof material; alternatively, resin may be flowed through the roof material during the process. Finally, the roof material is rigidified and simultaneously bonded to the tub by means of that resin. FIG. 5 illustrates generally the way in which this can be done. FIG. 5 shows a cross-section through a tub 30 located in an inverted orientation against a mould 31 for a roof. The tub is formed of CFRP. There are hollow box sections in the tub as shown at 32. To form these hollow sections the material of the tub has been forced from the interior against an exterior tub mould and then cured. Each hollow section contains an inflatable bag or semi-rigid core 33 which was inflated during the process of forming the tub in order to force the material of the tub against the exterior mould. The material that is to form the roof, which in this case is a CFRP precursor such as a pre-preg, is laid up in the roof mould, as indicated at 34. Where the superstructure of the roof meets the tub, at 35, the material of the roof divides so that one part of it 36 extends in one direction over the surface of the tub away from meeting point 35 and one part of it 37 extends in the other direction over the surface of the tub from meeting point 35. This allows for a relatively large area of interface between the tub and the material of the roof. An inflatable bag or semi-rigid core 38 is located within the cavity 39 defined by the tub and the roof. When the roof is to be made rigid, the bag 38 is inflated so as to press the roof material 34 against the roof mould 31. The bag 33 in the tub can be pressurised at the same time, and pressure can also be applied if necessary against the exterior of the roof mould. Then the roof material is heated to cause it to cure whilst it is being pressed against the tub. Once the roof has been cured, the pressure can be released and the mould can be removed from the roof. Curing of the roof material could be initiated or accelerated by conditions other than heat.

In FIG. 5 the interior bag is capable of occupying the entire interior volume of the roof and tub. To make it easier to apply pressure to the interior of the roof there could be a rigid interior roof mould which generally follows the contours of the desired interior surface of the roof, and an inflatable bag could be located between that internal mould and the roof material.

FIG. 6 shows in more detail a cross-section of the interface between the roof and the tub.

The tub, which is rigid and has already been cured, is shown at 50. The cross-section of FIG. 6 is through a hollow region of the tub. The hollow region contains an inflatable bag 51 which was used to press the material of the tub against an exterior mould when the tub was being cured.

The roof is not yet cured. In this example the roof is formed from a pre-preg, but it could be formed from non-impregnated fibres through which resin is to be applied after the fibres have been laid up, for example by flowing resin through the fibres during the moulding process. Depending on the nature of the roof mould, the pre-preg or the fibres to form the roof could be laid up in the mould before or after the tub is offered up to the roof mould. In this example, the pre-preg 52 is laid up in the roof mould 53, 54 before the tub is offered up to the roof mould. The superstructure of the roof is in the form of a single monolithic sheet. Where the superstructure meets the tub, at junction 55, the plies of the pre-preg diverge. Some plies 56 of the pre-preg extend in one direction across the surface of the tub. Other plies 57 of the pre-preg extend from junction 55 in the opposite direction across the surface of the tub. This provides for a relatively large interface area between the tub and the roof. Furthermore, because the plies 56 and 57 diverge at a substantial angle, the joint (when cured) can be highly resistant to peeling forces. To this end, it is preferred that plies 56 and 57 diverge at an angle of between 45° and 135°, more preferably between 60° and 100°. It is advantageous for the angle of divergence to be less than 90° (e.g. between 45° and 90°, or between 60° and 90°) because then the plies 56 and 57 will cup around the lip of the tub, providing additional strength. The angle of divergence may be assessed by considering the average direction of the set of plies in question in a direction perpendicular to the junction 55, or by considering the minimum angle of divergence of any of the plies of each set in directions perpendicular to the junction 55. The junction 55 is preferably not outboard of the outermost part of the lip of the tub; and in that condition an angle of divergence less than 90° requires the lip of the tub to overhang a lower part of the tub to which the plies 57 extend.

In the configuration shown in FIG. 6, the junction 55 is at the outermost point on the top of the tub, plies 56 extend inwards along part or all of a top surface of the tub and plies 57 extend down part or all of the outer side surface of the tub. In another embodiment the junction 55 could be at the innermost point on the top of the tub, plies 56 could extend inwards along a top surface of the tub and plies 57 could extend down part or all of the inner side surface of the tub. In another embodiment the junction 55 could be between the innermost and outermost points on the top of the tub, and plies 56 and 57 could extend away from each other across the top of the tub and then optionally down one or both of the interior and exterior sides of the tub.

Inside the void defined by the roof and the tub is an internal vacuum bag 60. Vacuum bag 60 could fill the whole of that void, or it could be located between an internal roof mould and the non-cured roof material. The internal vacuum bag is located so that when inflated it will press the main structure of the roof (at 52) against the interior of the exterior roof mould 53 and will also press arm 56 of the split ply section against the tub—in this case against an upward-facing surface of the tub.

The exterior mould tool is formed of two parts 53 and 54. Part 53 is a rigid mould tool whose interior surface is shaped to the intended external surface of the roof. The rigid mould part 53 could be sufficiently strong to oppose by itself the pressure from internal bag 56, but that could result in the rigid mould part being excessively heavy, and so it is preferred that the rigid mould part is encased in an outer pressure bag 58 that can resist the pressure from the interior of the mould. In practice, the pressure could be applied by applying suction through a port 59 in the outer bag. That port could contain a one-way valve. When the roof is to be moulded a vacuum can be drawn through port 59. Atmospheric pressure in internal bag 60 will then cause that bag to inflate, whilst atmospheric pressure acting on the exterior of external bag 58 will press it against the mould tools 53, 54. It may be advantageous to apply higher than atmospheric pressure to the exterior of the mould tools and/or to the internal bag 56, for example by means of an autoclave.

Attached to rigid mould tool 53 is a flexible or soft mould tool 54. Rigid mould tool 53 defines the exterior surface of the roof where the roof does not overlap the tub. Flexible mould tool 54 defines the exterior surface of the roof where arm 57 of the split ply section overlaps the tub. The flexible mould tool could, for example, be a plate formed of flexible metal or carbon fibre sheet. Multiple such plates could cover the join between the roof and the tub. At its interface 61 with the rigid mould tool 53 the flexible mould tool is attached to the rigid mould tool. It could be bolted or clamped to the rigid mould tool; or the two could be integrated, with the flexible mould tool being thinner than the rigid mould tool or separated from it by a pliable hinge region. The location of the part of the flexible mould tool that is adjacent the rigid mould tool (at 62) is defined, by virtue of its proximity to the rigid mould tool. Further from that point 62 the flexible mould tool, which is enveloped by the exterior bag 58, can deform towards the tub when a pressure is applied on it by the exterior bag 58. The material 57 of the roof is located between the tub 50 and the flexible tool, so when the flexible tool is deformed towards the tub it presses the roof material against the tub. That pressure could be resisted solely by the tub, or additionally by pressure from the bag 51 that is internal to the cavity of the tub.

The flexible tool 54 has a number of effects. First, by flexing towards the tub it presses the material of the roof against the tub, consolidating the material to make a good joint between the roof and the tub. Second, the flexible tool can be of a material that is flexible but yet self-supporting and/or stiffer than the roof precursor material, unlike a typical vacuum bag. It may be stiffer than the material of the vacuum bag 58 that bears against it. Such a tool can impose a notably smooth outer surface on the joint between the tub and the roof, which is important if that joint will be exposed or will act as a functional surface on the finished vehicle. Third, in contrast to rigid tools, the flexibility of tool 54 means that it can press the roof material even against undercut regions of the tub, allowing good resistance to peeling loads. Once the roof has been moulded against the tub, if a flexible tool has been used to press the material of the roof against the undercut regions of the tub then the tool can still be lifted away from the tub when the roof is demoulded without the mould being disassembled.

It can be advantageous for the roof material that overlaps the tub to have a tapered or "feather edge" profile so that it is thicker adjacent the superstructure and thinner at its distal end 63 remote from the superstructure. A tapered profile can be achieved by staggering the ends of the plies of the roof material, so that successive plies are dropped off towards the distal end 63. The distal termination of the roof material 57 could be of single-ply thickness. When the tub and roof structure is in service, this tapered profile reduces stress concentrations in the tub. Compared to the joint shown in FIG. 1, stress concentrations are also reduced because of the absence of the thickness of adhesive layer 3.

To summarise one example of a process for moulding the roof, pre-preg carbon fibre/resin material to form the roof is laid up in the exterior roof mould 53, 54. The interior bag 60 is loaded into the mould space. Then the tub is offered up to the mould so that it sits loosely against arms 56 and 57 of the pre-preg. The whole structure is wrapped in outer bag 58. An autoclave vacuum is drawn through port 59 to pull the main roof structure against the interior of rigid mould body 53, to pull the wing 56 of the roof material against the top of the tub and to cause flexible tool 54 to flex and thereby press wing 57 of roof material against the exterior of the tub. The tub itself could react the loads against it, or bag 51 within the tub could be pressurised to react the loads. Then the structure is heated to cure the resin of the roof material. Finally the structure is demoulded by removal of the bags and mould bodies. Bags inside the tub (e.g. bag 51) may be left in situ if desired.

The resulting structure is a monocoque consisting of a vehicle tub to which a roof has been integrally moulded. The roof adheres to the tub by virtue of the resin that reinforces the roof, rather than by supplementary adhesive. Thus, when the roof is formed from a pre-preg, it is the resin present in the pre-preg that adheres the roof to the tub. If the roof is formed by resin transfer moulding, it is the resin that flows into the laid-up fibres during the moulding process that adheres the roof to the tub.

Each of the vacuum bags 51, 58, 60 could independently be an inflatable semi-rigid body, e.g. a flexible and/or elastic polyethylene box, or a fully flexible and/or elastic bag. Exterior bag 58, if present, could surround both the roof mould 53, 54 and the tub, or it could surround the roof but seal against the tub.

The roof could be co-cured on to the tub in the manner described above in any orientation. However, it is convenient for the roof to be moulded to the tub with the tub upside down and sitting on the roof mould, as illustrated in FIG. 5. This allows the fibres of the roof to be laid up more easily.

The tub is fully cured and rigid before the process of curing the roof begins, and preferably before it is offered up to the roof mould. The tub could be formed by resin transfer moulding. Preferably the tub is formed of the same material as the roof, since that gives the greatest stability to the joint between the tub and the roof. It is particularly advantageous if the tub and roof are of composite materials whose matrix material is the same. Some or all of the regions of the tub that will make contact with the roof material could be treated before the roof is cured to improve adhesion between the tub and the roof. For example, those regions could be abraded to roughen their exterior surfaces or they could be less than fully loaded with resin so that they are porous and/or have exposed fibre relief at their external surfaces. The tub could be augmented with a film of adhesive in the regions where the tub where will make contact with the material of the roof. This could improve the adhesion of the roof to the tub. Alternatively, there could be an absence of adhesive between the tub and the material of the roof, and the roof could be bonded to the tub solely by one or more adhesives intimately comprised in the roof material itself.

The tub and/or the roof can be formed of any suitable material, and could be of the same or different materials. Conveniently, the roof is formed of a polymer-based material, such as a composite material having a polymer matrix. Preferably the matrix is formed of a material whose curing is initiated or accelerated on application of heat. The matrix could be formed of a resin such as an epoxy resin. The roof could be formed of a fibre-reinforced material. Conveniently it can be formed of a reinforced polymer composite material such as a carbon fibre reinforced polymer. A matrix of the roof material could be reinforced with other components such as aramid or glass fibres, or particles.

It is desirable to have good control over the location of the roof relative to the tub, so that when items such as doors and windows come to be fitted to the resulting vehicle there are no dimensional problems in locating them against the tub/roof structure. This can be done by providing the tub with datum structures and locating the roof mould 31/53, 54 against those structures. The datum structures could be machined or moulded into the tub. The same datum structures could be used to locate components of the vehicle against the tub when those components are attached. For example, the roof mould could be located against the tub by aligning reference points on the roof mould with datum points on the mounting structures 15 of the tub. Then the same datum points could be used when the front running gear is attached to those structures. Dimensional integrity is particularly significant when a functional surface of the tub/roof structure bridges the tub and the roof; as, for example, with a door seal.

The use of flexible tools for consolidating regions of the roof material that overlap the tub also helps dimensional stability. Because the flexible tools are stiffer than a simple vacuum bag they impose a relatively smooth surface on the parts of the roof that they act against. If those parts include functional surfaces such as door sealing surfaces, that smoothness can improve the effectiveness and reliability of those surfaces. If those parts include surfaces that will be exposed in the final vehicle, that smoothness can improve the aesthetics of those surfaces.

Some parts of the roof could be monolithic, as shown at 52 in FIG. 6. Parts of the roof could be hollow. Similar techniques to those described above could be used for attaching to a tub an element that is not a full roof, for example a roll-over protection hoop, or for attaching a structure to a pre-cured component that is not a tub.

The flexible tools 54 are conveniently made of thin sheets of rigid material such as aluminium, steel or carbon fibre. The tools are preferably sufficiently stiff that they are self-supporting and will not buckle when pressed against the roof material and the tub by autoclave pressure, but sufficiently flexible that they will deform inwardly under autoclave pressure to consolidate the roof material against the tub. A typical vacuum bag as used in moulding is capable of stretching during the moulding process, especially at elevated temperatures. In contrast, a flexible tool as used in the present process is preferably capable of flexing perpendicular to its major plane, but not capable of stretching in that plane during the moulding process. Furthermore, a typical vacuum bag is sufficiently soft that during the moulding process it will flex to conform to local irregularities, such as steps, in the part against which it is pressed. In contrast, the flexible tool is preferably sufficiently stiff that during the moulding process it will not conform to such irregularities. For example, the flexible tool could be sufficiently stiff that during the moulding process it cannot adopt a bend radius of less than 5 cm, more preferably 20 cm. The flexible tool is preferably anchored to the rigid tool. During the moulding process the rigid tool is preferably held fast with the tub. As a result of the flexible tool being anchored to the rigid tool and the rigid tool being held relative to the tub, the degree of movement of the flexible tool towards the tub under pressure is preferably dependent on the stiffness of the flexible tool. Parts of the flexible tools could be rigid with the exception of a weaker pliable zone at their join to the rigid mould tool (e.g. at 62 in FIG. 6). Alternatively the entire area of the flexible mould tool that interfaces with the roof material could be capable of deforming under autoclave pressure. In the system as illustrated in FIG. 6 the flexible tools are separate from the external vacuum bag 58 and cannot by themselves support a pressure differential between one side of them and the other. In an alternative embodiment the external vacuum bag could be made integral with the flexible tools, so it would have a relatively stiff region where it constitutes the flexible tools and would be more flexible elsewhere.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

That which is claimed:

1. A method for forming a vehicle body, comprising:
   forming a rigid tub;
   mating the rigid tub to a first mould for a superstructure of the vehicle body; and subsequently
   rigidifying material in the first mould whilst part of that material is in contact with the tub to thereby form the superstructure of the vehicle body integral with the tub, said material comprising a superstructure portion and a bonding portion integral with the superstructure portion and in contact with the tub,
   wherein the first mould comprises a flexible portion where the bonding portion overlaps the tub and the rigidifying step comprises causing the flexible portion to flex so as to bear against at least part of the bonding portion; and a non-flexible portion with a surface that defines the shape of at least part of the superstructure portion where the superstructure portion does not overlap the tub.

2. A method as claimed in claim 1, wherein the step of mating the rigid tub to the first mould comprises locating the tub to the first mould by aligning a datum feature on the tub with a datum feature on the first mould.

3. A method as claimed in claim 2, comprising, after the said rigidifying step, attaching a component of the vehicle to the tub with the datum feature on the tub aligned with a datum feature on the component.

4. A method as claimed in claim 3, wherein the component is a part of at least one of a running gear or a powertrain of the vehicle.

5. A method as claimed in claim 1, wherein the said material is a fibre-reinforced material and fibres of the material extend between the superstructure portion and the bonding portion.

6. A method as claimed in claim 1, wherein:
   the flexible portion comprises a distal region and a proximal region located between the distal region and the superstructure portion, and the distal region has greater freedom of movement than the proximal region.

7. A method as claimed in claim 1, wherein the rigidifying step comprises applying pressure to the flexible portion to consolidate the bonding portion against the tub.

8. A method as claimed in claim 7, wherein following the rigidifying step the bonding portion is thinner at an end remote from the superstructure portion than at an end proximal to the superstructure portion.

9. A method as claimed in claim 1, wherein:
   the step of forming a rigid tub comprises:
       pressing a hollow body of material against the interior of a second mould by means of an inflatable core located within the hollow body;
       rigidifying the hollow body with the inflatable core located therein so as to form at least part of the tub; and
       keeping the inflatable core in the hollow body of the tub until the said step of rigidifying material in the first mould; and
   the step of rigidifying material in the first mould comprises applying pressure against the first mould by means of the inflatable core.

10. A method as claimed in claim 1, wherein:
    the material of the superstructure is of a reinforced resin composite material;
    the step of rigidifying material in the first mould comprises curing the resin; and
    the superstructure is adhered to the tub by the resin.

11. A method as claimed in claim 1, wherein, at an interface between the superstructure and the tub, the material of the superstructure bifurcates such that a first limb of the material extends in a first direction over the tub and a second limb of the material extends in a second direction over the tub, the angle between the first and second directions being between 45° and 135°.

12. A method for forming an integrated structure comprising first and second bodies, the method comprising
    forming the first body in a rigid state; and
    subsequently:
        preparing a mould for the second body, the mould being mated to the first rigid body and the mould comprising a rigid first zone that does not overlap the first body and is adjacent to a first precursor material for the second body and a flexible second zone that overlaps the first body and is adjacent to a second precursor material for the second body;
        applying pressure against the flexible zone to urge the second precursor material against the first body; and
        rigidifying the first and the second precursor materials whilst the second precursor material is in contact with the first body.

13. A method as claimed in claim 12, wherein the flexible second zone is anchored to the rigid first zone.

14. A method as claimed in claim 13, wherein during the rigidifying step the flexible second zone is anchored to the rigid first zone at a boundary of the first body.

15. A method as claimed in claim 13, wherein the flexible second zone is constituted by one or more flexible plates attached to the rigid first zone.

16. A method as claimed in claim 13, wherein during the rigidifying step the flexible second zone has greater mobility relative to the first body at an end remote from the rigid first zone than at an end adjacent the rigid first zone.

17. A method as claimed in claim 12, wherein the step of applying pressure comprises causing the second precursor material to adopt a tapering profile that becomes thinner towards an edge of the second precursor material remote from the first precursor material.

18. A method as claimed in claim 12, wherein the precursor material comprises a resin matrix and a reinforcing component and the rigidifying step comprises bonding the second body to the first body by means of the resin comprised in the first and the second precursor materials.

19. A method as claimed in claim 12, wherein the first body comprises an adhesive layer and wherein, during the step of rigidifying the first and the second precursor materials, the second precursor material is in contact with the adhesive layer of the first body.

20. A method as claimed in claim 12, wherein the step of applying pressure comprises applying pressure by means of an inflatable flexible bag bearing against the flexible second zone.

* * * * *